Sept. 6, 1966 G. L. COOK, SR., ETAL 3,270,368
FISH SCALING DEVICE
Filed Oct. 7, 1964
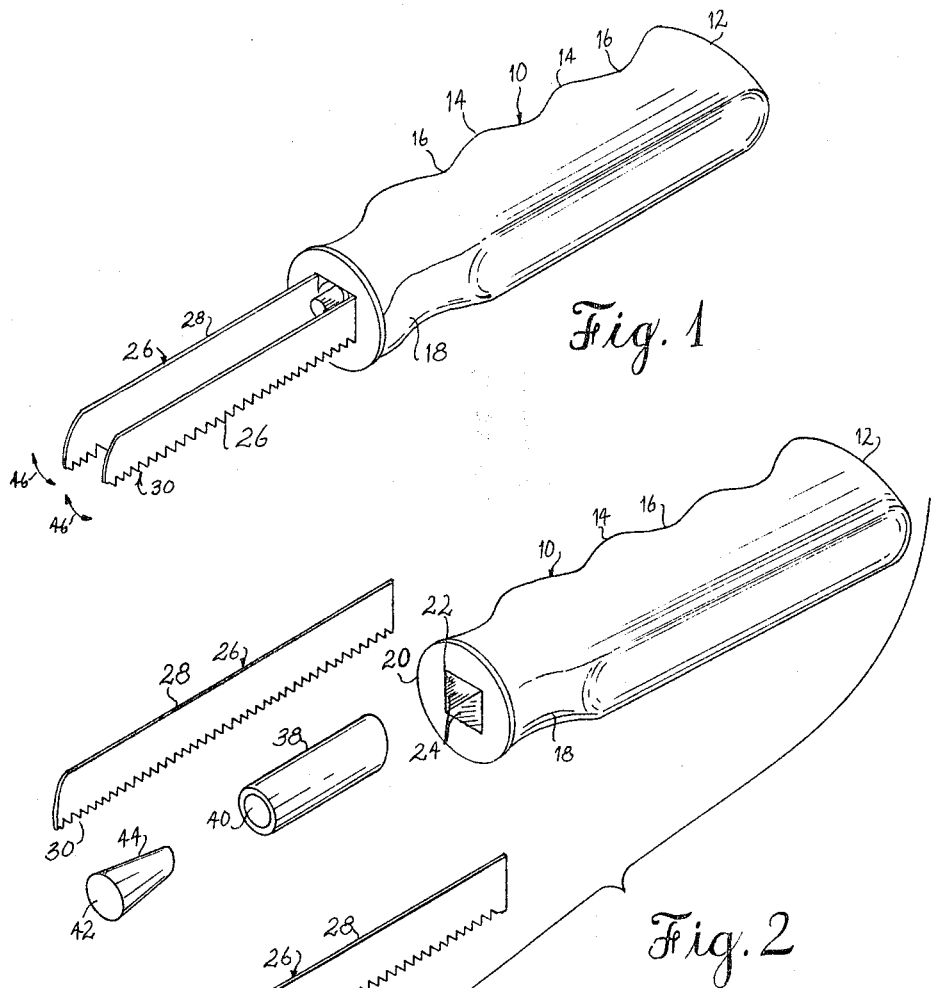
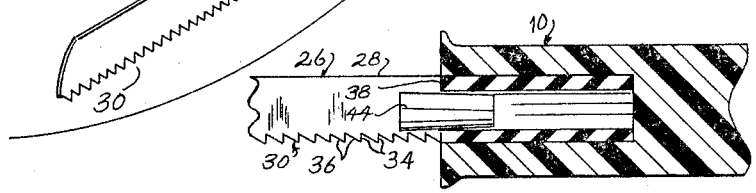
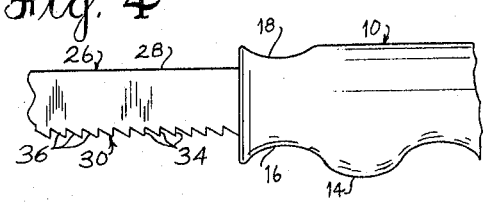
INVENTORS
GEORGE L. COOK, SR
RUSSEL H. BLOOM
BY
Newton, Hopkins & Jones
ATTORNEYS

3,270,368
FISH SCALING DEVICE
George L. Cook, Sr., and Russel H. Bloom, Atlanta, Ga., assignors to Julian B. Rozier, East Point, Ga.
Filed Oct. 7, 1964, Ser. No. 402,281
1 Claim. (Cl. 17—7)

The present invention relates to a new, useful and improved implement for preparing fish. More particularly, this invention relates to a device for scaling fish.

It is common knowledge that when cleaning fish the hands of the person cleaning the fish become slippery. This is due to the fact that fish are generally stored in ice water which wets the surface of the fish and also because in the actual cleaning of the fish the oils of the fish itself come in contact with the hands. Because of slippery hands, the person cleaning the fish often has difficulty in holding and manipulating the device for scaling the fish. In order for the fish cleaner to firmly grip the scaling device, applicants have developed a gripping means on the handle of the device which allows the device to be clutched firmly and securely notwithstanding slipperiness of the device.

Another problem encountered in previously known fish scaling devices is that the fish cleaner must take great care in the amount of force he uses in scraping the scaling device across the fish. The fish cleaner must use enough force to efficiently scrape away the scales of the fish but not so much force to cut the skin of the fish. Even when using the ideal amount of force against the skin of the fish, the fish cleaner must make several strokes across the same area of the fish in order to thoroughly remove the scales therefrom. Applicants have developed a fish scaling device with blades of calculated resiliency so that when used in the normal fish scaling manner, the blades will give or bend slightly when encountering an obstruction such as particularly rigid scales or fins or other parts of the fish. Furthermore, applicants employ two blades in their device so that the forces transmitted from the hand of the cleaner to the blades will be compensated between the blades. The use of two blades in the device allows the user to exert twice the amount of force on twice the amount of area of the fish which results in the requirement of only one-half the amount of strokes normally required in cleaning fish.

Other objects, features and advantages of the invention will become more readily apparent from the following description and the accompanying sheet of drawings.

Referring now to the drawings:

FIG. 1 is a perspective view of the device showing the relationship between the blades and the indentations on the handle;

FIG. 2 is an exploded perspective view of the device showing the components used for mounting the blades in the handle;

FIG. 3 is a cross-sectional view of the device with portions thereof broken away; and, FIG. 4 is a partial elevational view of the device with the blades oriented in an alternate manner.

Referring more particularly to the drawings, the device comprises a handle 10 having a butt portion 12 and finger lands and grooves 14 and 16, respectively. On the side of the handle opposite the side containing finger lands and grooves, there is a thumb indentation 18 at the end remote from the butt end 12. It is obvious that the user of the implement will be able to firmly grip the implement with his right hand as shown in FIG. 1, so that his fingers fit in the grooves 16 and his thumb will fit in the indentation 18.

At the end 20 of the handle 10 remote from the butt end 12, the handle defines a rectangular opening 22 which extends into the handle 10 along its axis.

Blades 26 are constructed of a dimension so that they fit flat against any one of the walls 24 of the hole 22. The blades 26 have upper and lower edges 28 and 30, respectively, with the lower edge 30 being serrated. The blades 26 are serrated in such a manner that teeth are formed thereon which have one edge 34 substantially perpendicular to the upper edge 28 of the blade 26 and another edge 36 which joins the perpendicular edges 34 alternately at their inner and outer ends. This manner of serrating the blades 26 results in having the teeth slanted toward one end of the blade.

The blades 26 of the device can be mounted in the handle 10 in any number of ways; however, in using the device it has been found that the user occasionally likes to replace or reorientate the blades 26. Accordingly, the device has been fitted with a blade mounting means that allows ready removal of the blades from the handle. In this particular disclosure the means for mounting the blades comprises a resilient cylindrical tube 38 which is of a size and shape so that it can be inserted in the hole 22 between the blades 26. The tube 38 is of such a size that it is forced to conform with the general shape of the hole 22 and thereby compresses the blades 26 firmly against the sides 24 of the hole 22. After the tube 38 is inserted in the hole 22, a plug 42 is inserted in the hole 40 of the tube 38. The plug 42 has a tapered side 44 so that it can be resiliently wedged into the tube 38, thereby exerting an additional force against the blades 26 in positioning them against the sides 24 of the hole 22.

The advantage of this particular mounting means is that the tube 38 firmly holds the blades 26 against the sides 24 of the hole 22, but since the tube 38 is of a resilient material, some lateral movement of the blades 26 at their innermost ends is permitted. Since the plug 42 is formed of a solid material, very little movement of the blades 26 is permitted near the end 20 of the handle 10. The portion of the blade which is wedged between tube 38 and the end of the handle 20 acts as a pivot portion or fulcrum. Accordingly, the resiliency of the tube 38, coupled with the wedging action of the plug 42 and the inherent resiliency of the blades 26, functions to allow the blades to vibrate or bend as indicated by the arrows 46 of FIG. 1.

In the instant example of the device, the blades 26 have been formed from a carbon steel somewhat like the blades on a conventional band saw, and the tube 38 has been formed of an elastomerized material. The handle 10 can be formed from fiber glass, or less expensively from any number of various plastic materials. The plug 42 can be formed of any solid material such as wood or hard plastic.

In using the device it has been found that most users scale fish with the butt portion 12 leading the blades 26 at a slight angle. Also, the user usually likes to grip the handle 10 in such a manner that the knuckles of the hand are on the side of the handle away from the fish and the finger tips are on the side of the handle closest to the fish. Accordingly, this orientates the lands and grooves of the handle to the side away from the heel of the hand. When using the device in this manner, the blades 26 should be inserted so that the serrated edges face the fish and the teeth of the serration are angled toward the handle. By inserting the blades 26 in the handle 10 so that the teeth are angled toward the handle, the perpendicular portion 34 of the teeth are disposed so that they come into primary scraping contact with the scales of the fish. It can be seen that if the blades were orientated so that the slanted portion of the teeth came in primary contact with the scales that the blades would tend to ride up over the scales and be ineffective.

It can be seen that the construction of the mounting means enables the user of the device to easily remove the blades from the handle and replace the blades in a different position. For example, if the user of the device was left-handed and desired to use the device in his left hand, it would be desirable for him to remove the blades and reinsert them so that the serrated edge 30 would be on the top of the blades 26 as seen in FIG. 1.

Because of the user's particular method of scaling fish, he might desire that the lands and grooves 14 and 16 be disposed on the handle nearest the surface of the fish as shown in FIG. 4. With the device assembled in this manner, both right-handed and left-handed users could use the device without having to reposition the blades.

Furthermore, if the user of the device scaled fish with a motion so that the blades 26 lead the handle 10, it would be desirable to remove the blades from the position as shown in FIG. 1 and replace them so that the teeth are angled away from the handle 10. In this manner, the perpendicular portion 34 of the blades 26 would be orientated towards the scales of the fish. Also, the user of the device might deem it advantageous to have one blade with the teeth angled towards the handle and the other blade having the teeth angled away from the handle. In this manner he would get effective scaling action from at least one of the blades regardless of the manner in which he scaled fish. Furthermore, if the user desired, one of the blades 26 could be inverted so that one serrated edge and one smooth edge of the blade would come in contact with the surface of the skin simultaneously.

It should be obvious at this point that the means disclosed herein for mounting the blades in the handle render the device extremely flexible and adaptable to the whim of the user.

Because the blades are mounted on the cantilever principle and because of the resiliency of the blades themselves and of the flexibility of the mounting means 38, the blades will tend to bend when encountering an obstruction on the surface of the fish. It can be seen that if a blade were rigid and encountered an obstruction on the surface of the fish, the force exerted on the device by the user would be immediately transmitted to the obstruction; whereas, in the instant device the flexibility of the blades allows a gradual build-up of the force exerted by the device on the obstruction by the user. This gradual build-up allows the user to detect the obstruction before the full force is exerted thereon. Furthermore, the spring-like characteristics of the blades have been found to aid in the process of scaling fish. It is believed that when a blade comes in contact with a first scale it tends to bend backwards from the direction of motion until it overcomes the resistance of the first scale, and then after the resistance has been overcome the blade whips forward to meet the next scale. In this manner the kinetic energy built up in removing the first scale is not wasted as in previous devices but is utilized in removing subsequent scales.

The fact that the device has two blades not only gives the user double the blade surface and force operating on the fish at one time, but also allows the two blades to work in conjunction with each other. If any scales are missed by the blades first crossing the surface of the first, the second blade follows in approximately the same path of the first blade in order to make a clean sweep of that area of the fish in one motion. Any scales partially removed by the first blade will be positively removed by the following blade.

It will be obvious to those skilled in the art that many variations may be made in the embodiment chosen for the purpose of illustrating the present invention without departing from the scope thereof as defined by the appended claim.

What is claimed as our invention is:

A first scaling device comprising:
(a) a handle of a generally elongated cylindrical configuration having finger indentations thereon,
(b) said handle defining a hole of rectangular cross-section at one end thereof,
(c) two blades supported by said handle by having one end of each blade inserted into said rectangular hole on opposite sides thereof,
(d) means for supporting said blades in said handle comprising:
 (1) a resilient cylindrically shaped tube disposed between said blades in said hole, and
 (2) plug means wedged in said tube whereby said tube is forced against said blades,
(e) each of said blades having serrations on one side thereof with one edge of the serration being substantially perpendicular to the longitudinal axis of the blade and the other edge of said serration joining the outer end of one perpendicular serration near said handle to the inner end of another perpendicular serration away from said handle.

References Cited by the Examiner

UNITED STATES PATENTS

| 72,447 | 12/1867 | Brown | 279—76 X |
| 614,810 | 11/1898 | Houghton. | |
| 766,144 | 7/1904 | Gilcrest | 279—87 X |
| 1,847,062 | 2/1932 | Lemmon | 30—304 |
| 2,039,926 | 5/1936 | Paradise | 30—329 X |
| 2,158,728 | 5/1939 | Peters | 273—24 X |
| 2,352,013 | 6/1944 | Roth | 30—340 X |
| 2,372,831 | 4/1945 | Howard | 17—7 |

OTHER REFERENCES

Thomas: "Three Way Knife for the Fisherman," in Popular Science, July 1946, page 173, Q 1.P8.

SAMUEL KOREN, *Primary Examiner.*

LUCIE H. LAUDENSLAGER, *Examiner.*

H. P. DEELEY, JR., *Assistant Examiner.*